(12) United States Patent
Shimono et al.

(10) Patent No.: US 11,648,708 B2
(45) Date of Patent: May 16, 2023

(54) COMPOSITE MATERIAL MOLDING JIG AND COMPOSITE MATERIAL, MOLDING METHOD

(71) Applicant: MITSUBISHI HEAVY INDUSTRIES, LTD., Tokyo (JP)

(72) Inventors: Kodai Shimono, Tokyo (JP); Hiroshi Tokutomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 212 days.

(21) Appl. No.: 16/627,571

(22) PCT Filed: Aug. 10, 2017

(86) PCT No.: PCT/JP2017/029028
§ 371 (c)(1),
(2) Date: Dec. 30, 2019

(87) PCT Pub. No.: WO2019/030882
PCT Pub. Date: Feb. 14, 2019

(65) Prior Publication Data
US 2020/0223104 A1    Jul. 16, 2020

(51) Int. Cl.
*B29C 33/38* (2006.01)
*B29C 70/48* (2006.01)
(Continued)

(52) U.S. Cl.
CPC ............ *B29C 33/38* (2013.01); *B29C 33/305* (2013.01); *B29C 70/48* (2013.01); *B29C 33/0038* (2013.01)

(58) Field of Classification Search
CPC ..... B29C 33/0038; B29C 33/38; B29C 33/56; B29C 33/60; B29C 37/0067; B29C 70/44;
(Continued)

(56) References Cited

U.S. PATENT DOCUMENTS 5,087,193 A * 2/1992 Herbert, Jr. ......... B29C 43/3642
                                                          425/389
5,135,382 A * 8/1992 Tsuchiya ............ B29D 99/0003
                                                          425/DIG. 129
(Continued)

FOREIGN PATENT DOCUMENTS

EP         0446851 A1    9/1991
EP         1151850 A2    11/2001
(Continued)

OTHER PUBLICATIONS

International Search Report issued in corresponding International Application No. PCT/JP2017/029028 dated Oct. 17, 2017 (5 pages with Translation).

(Continued)

*Primary Examiner* — Leith S Shafi
(74) *Attorney, Agent, or Firm* — Osha Bergman Watanabe & Burton LLP (57) ABSTRACT

A composite material molding jig for molding a long member made of a fiber base material and a resin on a plate member includes: a first member that is made of a material having a thermal expansion coefficient equivalent to a thermal expansion coefficient of the long member, internally includes a space serving as a mold of the long member, and has an outer surface formed flat in a longitudinal direction; and a second member that is made of a material lighter than the material of the first member, internally includes a space shaped to contain the first member, and has an inner surface formed flat in the longitudinal direction, wherein the fiber base material is placed in the space inside the first member, and the first member is placed in the space inside the second member for molding the long member.

12 Claims, 9 Drawing Sheets

(51) Int. Cl.
*B29C 33/30* (2006.01)
*B29C 33/00* (2006.01)

(58) Field of Classification Search
CPC ..... B29C 70/443; B29C 70/446; B29C 70/48; B29C 70/541; B29C 70/543; B29C 33/305; B29C 70/342; B29C 33/3828; B29C 43/36; B29D 99/0014
See application file for complete search history.

(56) References Cited

U.S. PATENT DOCUMENTS

| | | | | |
|---|---|---|---|---|
| 5,152,949 | A * | 10/1992 | Leoni | B29C 43/3642 425/389 |
| 8,057,623 | B2 * | 11/2011 | Kallinen | B29C 70/545 156/221 |
| 9,168,681 | B2 * | 10/2015 | Bottero | B29C 33/68 |
| 10,232,569 | B2 * | 3/2019 | Murai | B29C 70/543 |
| 2001/0035249 | A1 * | 11/2001 | Kondo | B29D 99/0003 156/65 |
| 2002/0027187 | A1 * | 3/2002 | Sato | B29C 70/543 249/187.1 |
| 2010/0059169 | A1 | 3/2010 | Lengsfeld et al. | |
| 2010/0314807 | A1 * | 12/2010 | Lengsfeld | B29C 43/3642 264/571 |
| 2014/0353876 | A1 * | 12/2014 | Murai | B29C 70/30 425/406 |
| 2014/0360657 | A1 * | 12/2014 | Murai | B29D 99/0014 156/500 |
| 2015/0099834 | A1 * | 4/2015 | Barnell | B29C 70/443 523/468 |
| 2016/0339615 | A1 | 11/2016 | Abe et al. | |
| 2017/0239896 | A1 * | 8/2017 | Stawski | B29C 33/60 |
| 2018/0297300 | A1 | 10/2018 | Tokutomi et al. | |

FOREIGN PATENT DOCUMENTS

| | | |
|---|---|---|
| EP | 3072661 A1 | 9/2016 |
| JP | H01-156024 U | 10/1989 |
| JP | 2947873 B2 | 9/1999 |
| JP | 2014-237243 A | 12/2014 |
| WO | 2015/115433 A1 | 8/2015 |
| WO | 2017/043266 A1 | 3/2017 |

OTHER PUBLICATIONS

Written Opinion of the International Searching Authority issued in corresponding International Application No. PCT/JP2017/029028 dated Oct. 17, 2017 (9 pages with Translation).

European Search Report issued in corresponding European Application 17921329.3 dated Jul. 28, 2020 (10 pages).

* cited by examiner

COMPOSITE MATERIAL MOLDING JIG AND COMPOSITE MATERIAL, MOLDING METHOD

TECHNICAL FIELD

The present invention relates to a composite material molding jig and a composite material molding method for a resin composite material.

BACKGROUND ART

A molding method of molding a thermosetting resin composite material with use of a mold made of a material having a thermal expansion coefficient same as a thermal expansion coefficient of a molded article (PTL 1).

CITATION LIST

Patent Literature

[PTL 1]
the Publication of Japanese Patent No. 2947873

SUMMARY OF INVENTION

Technical Problem

Figure 9:
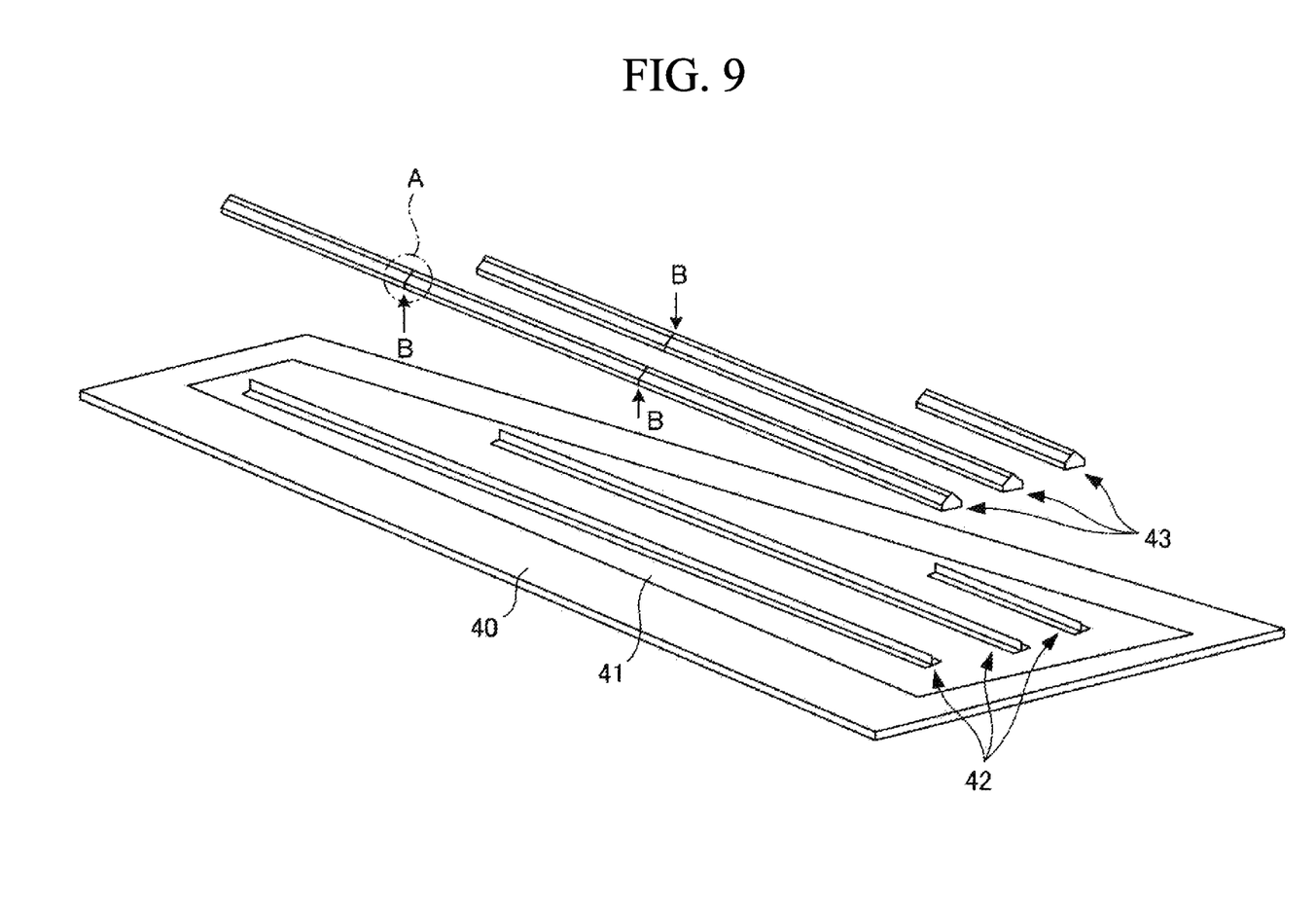
FIG. 9 is a perspective view illustrating a method of molding a structural member of an aircraft.

Fiber Reinforced Plastics (FRP) and Carbon Fiber Reinforced Plastics (CFRP), which are resin composite materials, are lightweight and excellent in mechanical strength. Therefore, the resin composite materials are used for a structural member of an aircraft and the like. For example, to mold a skin of the aircraft or a reinforcing stringer, a cured or raw (uncured) skin 41 is placed on a lower mold 40, a raw (uncured) stringer 42 made of a fiber base material is placed on the skin 41, and an upper mold (mandrel 43) is placed on the stringer 42 as illustrated in FIG. 9. Further, after the raw skin 41 and the raw stringer 42 are impregnated with a resin, the resin is heated and cured to mold the structural member including the cured skin 41 and the cured stringer 42.

As the mandrel 43 used for molding the resin composite material, a lightweight mandrel made of an aluminum alloy is used for manual handling. In particular, in a case where a large-sized (1 m or more) molded article is molded, deformation may occur due to thermal expansion of the mandrel 43. Therefore, the mandrel 43 is divided in a longitudinal direction. For example, in FIG. 9, the mandrel 43 is divided into a plurality of parts at dividing zones B. In a case where the mandrel 43 is divided in such a manner, a gap for accommodating thermal expansion is provided using a spacer, leading to prolonged installation of the mandrel 43.

Figure 10:
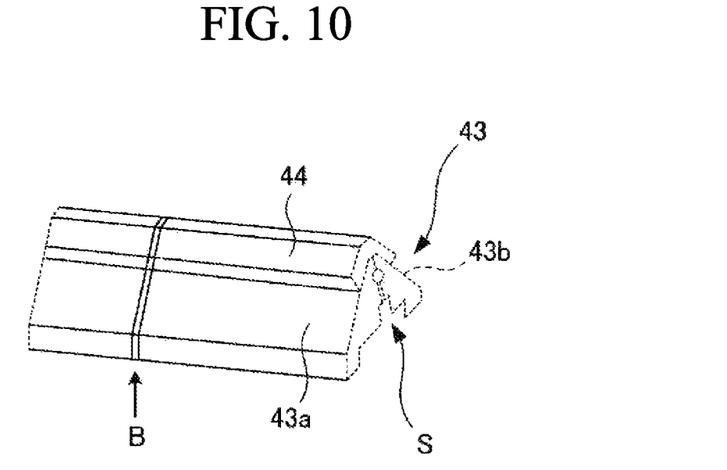
FIG. 10 is an enlarged view of a region A of a mandrel illustrated in FIG. 9.
Figure 11:
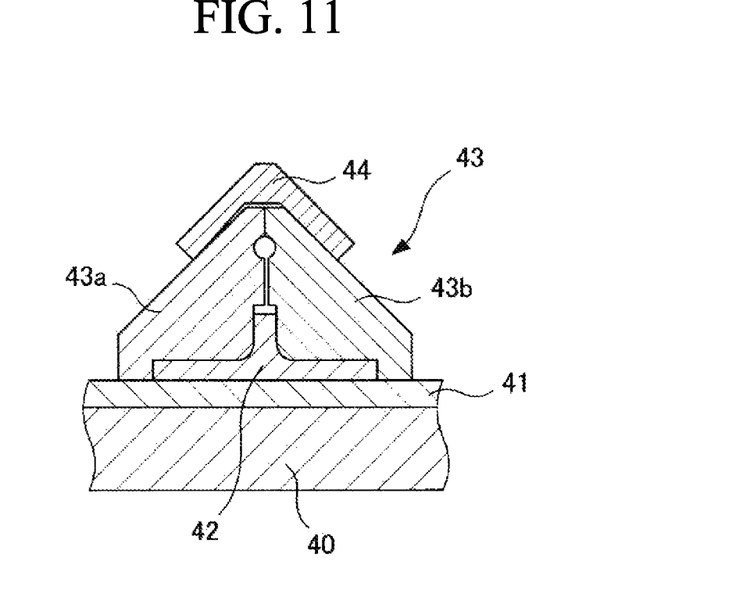
FIG. 11 is a cross-sectional view of the mandrel illustrated in FIG. 9.

A structure of the mandrel 43 will be described with reference to FIG. 10 and FIG. 11. The mandrel 43 has a substantially triangular prism shape, and has a substantially triangular cross-section. The stringer 42 has an inverted T-shaped cross-section. Therefore, the mandrel 43 that is a mold to form the stringer 42 internally includes an inverted T-shaped space S in a longitudinal direction. The mandrel 43 may be made up of one member; however, in a case where a thickness of the stringer 42 is changed during molding, it is necessary to divide the mandrel 43 not only in the above-described longitudinal direction but also in a width direction. For example, as illustrated in FIG. 10 and FIG. 11, the mandrel 43 is made up of two blocks 43a and 43b that are divided at a center in the width direction of the mandrel 43. In this case, to prevent the two blocks 43a and 43b from falling down during molding, an angle member 44 having a substantially L-shaped cross section is disposed at a top part of the mandrel 43 (blocks 43a and 43b).

As described above, the mandrel 43 is divided not only in the longitudinal direction but also in the width direction in some cases. In such a case, installation of the mandrel 43 further takes a lot of time.

An object of the present invention, which has been made to solve the above-described problems, is to provide a composite material molding jig and a composite material molding method that are easy in installation and can contribute to reduction in a manufacturing cost.

Solution to Problem

According to a first invention to solve the above-described problems, a composite material molding jig for molding a long member made of a fiber base material and a resin on a plate member, includes: a first member that is made of a material having a thermal expansion coefficient equivalent to a thermal expansion coefficient of the long member, internally includes a space serving as a mold of the long member, and has an outer surface formed flat in a longitudinal direction; and a second member that is made of a material lighter than the material of the first member, internally includes a space shaped to contain the first member, and has an inner surface formed flat in the longitudinal direction. The fiber base material is placed in the space inside the first member, and the first member is placed in the space inside the second member for molding the long member.

According to a second invention to solve the above-described problems, in the composite material molding jig according to the above-described first invention, the first member has an outer shape similar to a shape of the internal space.

According to a third invention to solve the above-described problems, in the composite material molding jig according to the above-described first or second invention, the second member is provided over an entire length of the first member or is provided at a plurality of positions of a part of the entire length of the first member.

According to a fourth invention to solve the above-described problems, in the composite material molding jig according to any one of the above-described first to third inventions, a surface of the first member and a surface of the second member coming into contact with each other are coated with a mold release agent, are stuck with a mold release tape, or are subjected to mold release coating.

According to a fifth invention to solve the above-described problems, in the composite material molding jig according to any one of the above-described first to fourth inventions, the first member is divided into two parts at a center in a width direction of the first member, and the second member is divided into two parts at a center in a width direction of the second member.

According to a sixth invention to solve the above-described problems, in the composite material molding jig according to the above-described fifth invention, in a case where the first member is divided in a longitudinal direction of the first member, one of the two parts divided in the width direction of the first member and another part are divided at different positions in the longitudinal direction.

According to a seventh invention to solve the above-described problems, in the composite material molding jig according to the above-described fifth or sixth invention, the second member has a triangular prism shape as a whole including the first member, and an angle member that has an L-shaped cross-section and is fitted to a top part of the triangular prism shape is provided at the top part.

According to an eighth invention to solve the above-described problems, a composite material molding method for molding a long member made of a fiber base material and a resin on a plate member, includes: placing the fiber base material to be the long member, on the plate member; placing the fiber base material in a space inside a first member, the first member being made of a material having a thermal expansion coefficient equivalent to a thermal expansion coefficient of the long member, internally including the space serving as a mold of the long member, and having an outer surface formed flat in a longitudinal direction; placing the first member in a space inside a second member, the second member being made of a material lighter than the material of the first member, internally including the space shaped to contain the first member, and having an inner surface formed flat in the longitudinal direction; sealing the plate member, the fiber base material, the first member, and the second member by a sealing means, and evacuating an inside of the sealing means; impregnating the fiber base material with a resin; and heating and curing the resin to mold the long member.

According to a ninth invention to solve the above-described problems, in the composite material molding method according to the above-described eighth invention, the first member has an outer shape similar to a shape of the internal space.

According to a tenth invention to solve the above-described problems, in the composite material molding method according to the above-described eighth or ninth invention, the second member is provided over an entire length of the first member or is provided at a plurality of positions of a part of the entire length of the first member.

According to an eleventh invention to solve the above-described problems, in the composite material molding method according to any one of the above-described eighth to tenth inventions, a surface of the first member and a surface of the second member coming into contact with each other are coated with a mold release agent, are stuck with a mold release tape, or are subjected to mold release coating.

According to a twelfth invention to solve the above-described problems, in the composite material molding method according to any one of the above-described eighth to eleventh inventions, the first member is divided into two parts at a center in a width direction of the first member, and the second member is divided into two parts at a center in a width direction of the second member.

According to a thirteenth invention to solve the above-described problems, in the composite material molding method according to the above-described twelfth invention, in a case where the first member is divided in a longitudinal direction of the first member, one of the two parts divided in the width direction of the first member and another part are divided at different positions in the longitudinal direction.

According to a fourteenth invention to solve the above-described problems, in the composite material molding method according to the above-described twelfth or thirteenth invention, the second member has a triangular prism shape as a whole including the first member, and an angle member that has an L-shaped cross section and is fitted to a top part of the triangular prism shape is provided at the top part.

Advantageous Effects of Invention

According to the present invention, it is not necessary to uselessly divide the composite material molding jig in the longitudinal direction, and if the composite material molding jig is divided into parts, the parts can be disposed in contact with one another. This eliminates necessity of management of a gap, remarkably facilitates installation, and reduces a manufacturing cost. Further, a use amount of an alloy with low expansion coefficient, which is expensive, can be reduced and the manufacturing cost can be reduced because the outer shape of the first member is formed in a shape similar to the shape of the long member.

DESCRIPTION OF EMBODIMENTS

A composite material molding jig and a composite material molding method according to the present invention are described below with reference to drawings.

Embodiment 1

Figure 1:
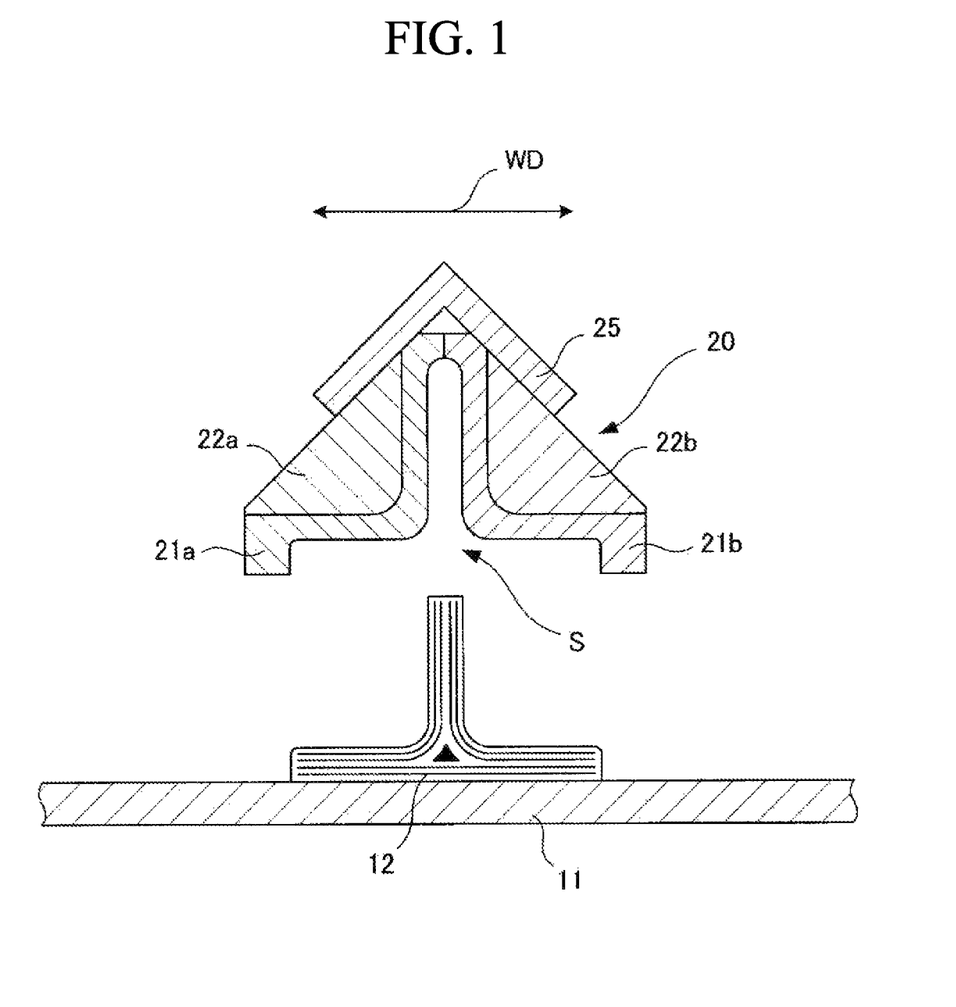
FIG. 1 is a cross-sectional view illustrating an example of an embodiment of a composite material molding jig according to the present invention.
Figure 2:
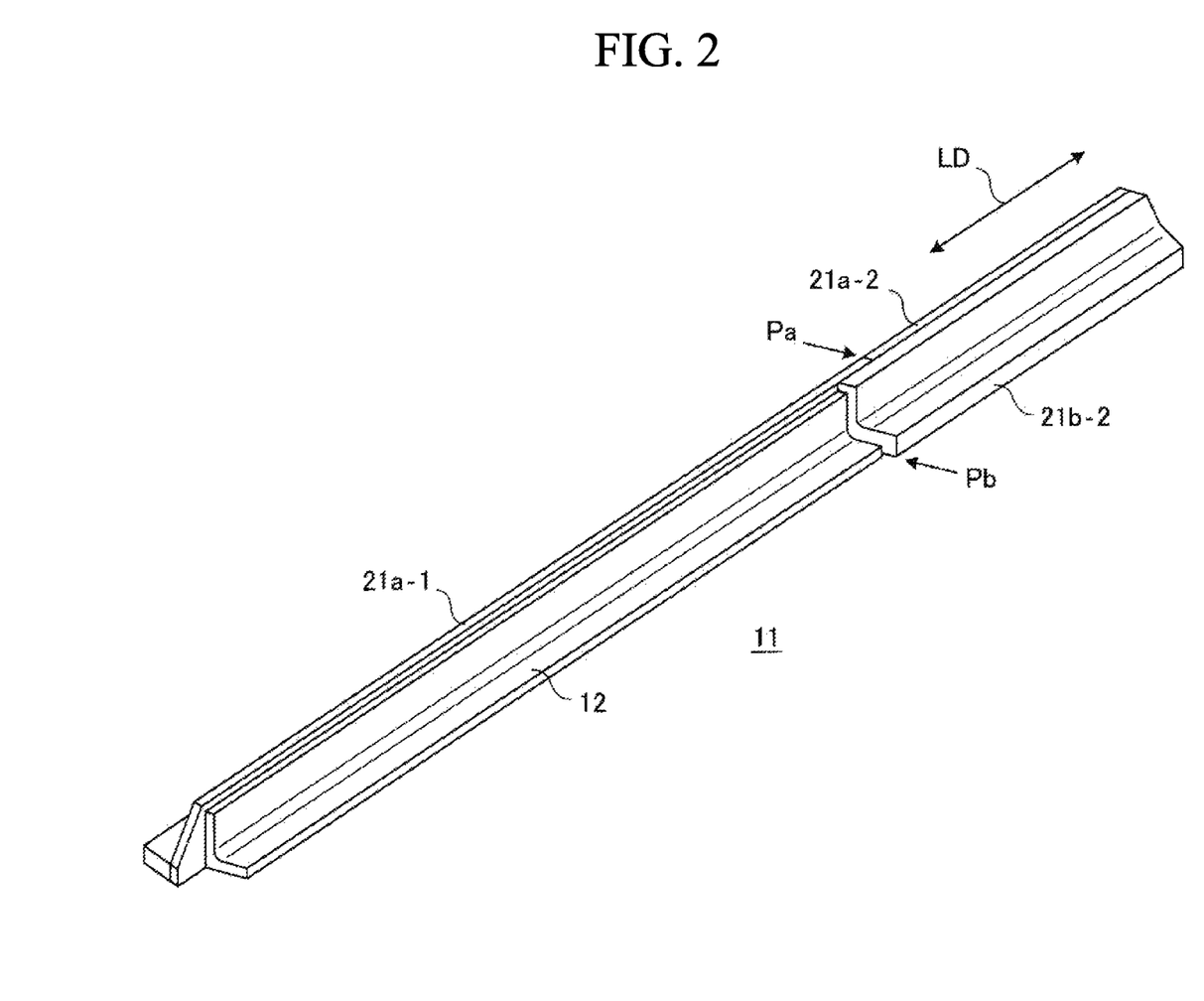
FIG. 2 is a perspective view illustrating a state where a part of first members constituting the composite material molding jig illustrated in FIG. 1 is disposed.
Figure 3:
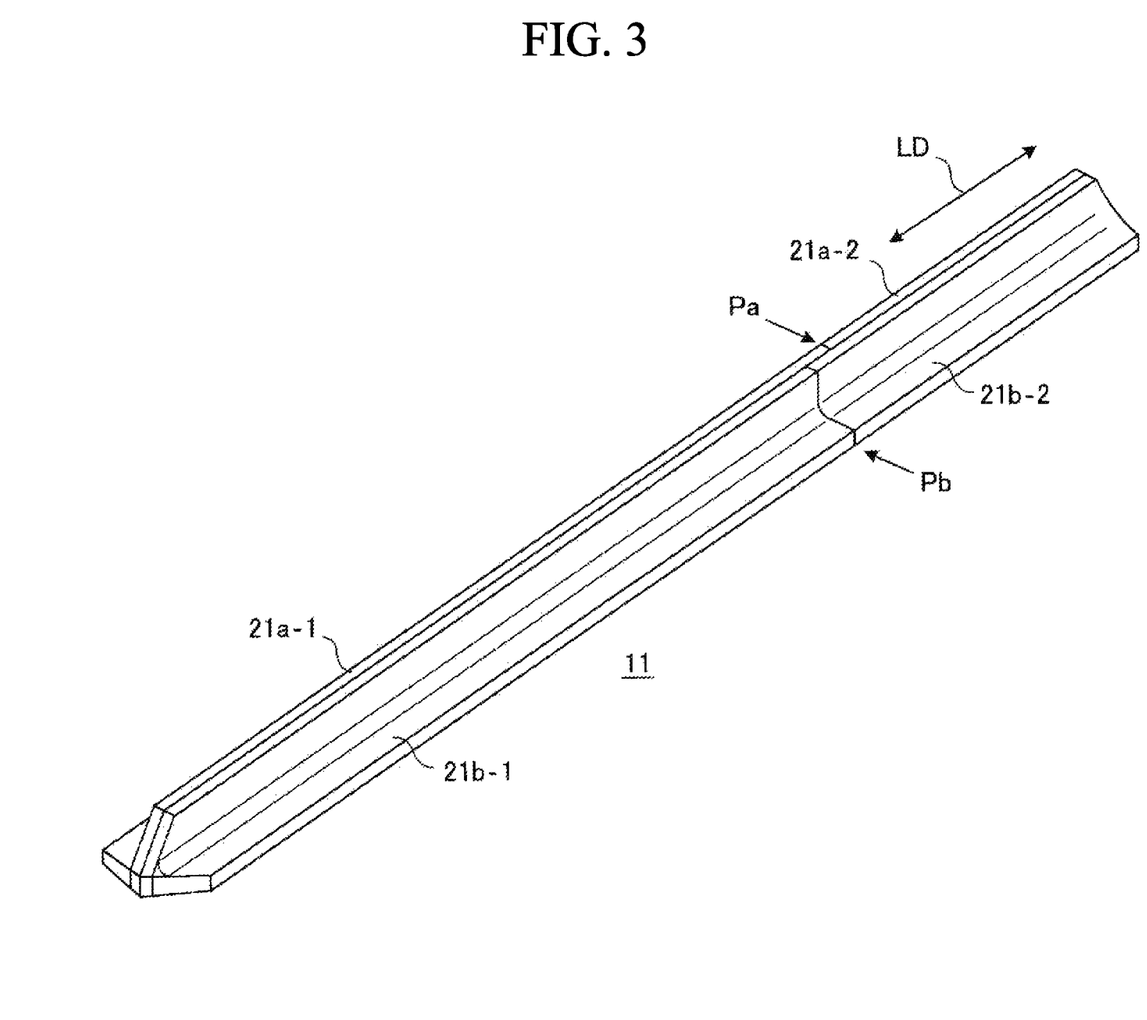
FIG. 3 is a perspective view illustrating a state where all of the first members constituting the composite material molding jib illustrated in FIG. 1 are disposed.
Figure 4:
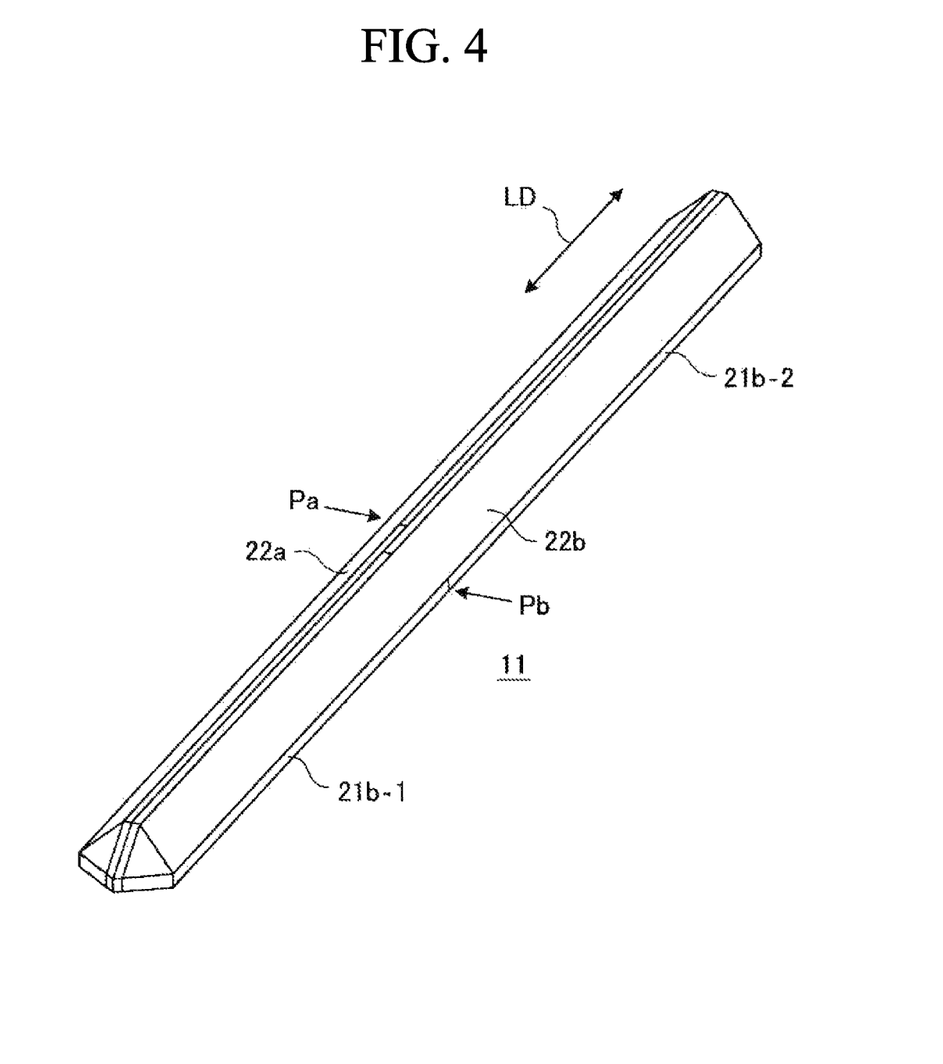
FIG. 4 is a perspective view illustrating a state where all of the first members and second members constituting the composite material molding jig illustrated in FIG. 1 are disposed.

FIG. 1 is a cross-sectional view illustrating a composite material molding jig according to the present embodiment. Further, FIG. 2 is a perspective view illustrating a state where a part of first members constituting the composite material molding jig illustrated in FIG. 1 is disposed. FIG. 3 is a perspective view illustrating a state where all of the first members constituting the composite material molding jig illustrated in FIG. 1 are disposed. FIG. 4 is a perspective view illustrating a state where all of the first members and second members constituting the composite material molding jig illustrated in FIG. 1 are disposed.

A mandrel 20 (composite material molding jig) according to the present embodiment is also a mold for a raw (uncured) stringer 12 (long member) made of a fiber base material placed on a cured or raw (uncured) skin 11 (plate member). The mandrel 20 has a substantially triangular prism shape and has a substantially triangular cross-section. The stringer 12 has an inverted T-shaped cross-section. Therefore, the mandrel 20 internally includes an inverted T-shaped space S in a longitudinal direction. The stringer 12 has the inverted T-shape in this example; however, the stringer 12 may have the other shape. In this case, the shape of the space S is also changed depending on the shape of the stringer 12. Note that, in an aircraft, the skin 11 constitutes, for example, a surface skin of a wing. For example, carbon fibers and glass fibers are used as the fiber base material.

In the present embodiment, the mandrel 20 is divided into first members 21a and 21b on an inside and second members 22a and 22b on an outside. Further, in this case, in consideration of change in a plate thickness of the stringer 12 during molding, the first members 21a and 21b are separable at a center in a width direction WD, and the second members 22a and 22b are also separable at the center in the width direction WD. Note that, in a case where the plate thickness is not changed, the first members 21a and 21b may be integrally structured, and the second members 22a and 22b may also be integrally structured.

In the first members 21a and 21b, the first member 21a has a substantially L-shaped cross-section, the first member 21b also has a substantially L-shaped cross-section, and a space between the first member 21a and the first member 21b serves as a space S to form the stringer 12. In other words, the space S serving as a mold of the stringer 12 is formed inside the whole of the first members 21a and 21b, and the outside of the whole of the first members 21a and 21b is formed in a shape similar to the space S.

Further, in the second members 22a and 22b, the second member 22a has a substantially triangular cross-section, the second member 22b also has a substantially triangular cross-section, and a space between the second member 22a and the second member 22b serves as a space shaped to contain the first members 21a and 21b. In other words, the space shaped to contain the first members 21a and 21b is formed inside the whole of the second members 22a and 22b. In addition, the shape of the whole of the second members 22a and 22b including the first members 21a and 21b is a substantially triangular prism shape.

Further, in the case where the first members 21a and 21b and the second members 22a and 22b are separated in the width direction WD, an angle member 25 that has a substantially L-shaped cross-section and is fitted to a top part of the mandrel 20 (first members 21a and 21b and second members 22a and 22b) having the substantially triangular prism shape is preferably provided at the top part in order to prevent the first members 21a and 21b and the second members 22a and 22b from falling down during formation of the stringer 12.

Further, in the present embodiment, the first members 21a and 21b coming into contact with the stringer 12 are made of a material having a thermal expansion coefficient substantially same as a thermal expansion coefficient of the stringer 12, for example, a 36%-Ni alloy (invar material) as a low expansion alloy or CFRP. In contrast, the second members 22a and 22b outside the first members 21a and 21b are made of a material lighter than the material of the first members 21a and 21b, for example, an aluminum alloy.

Even when density of the material constituting the first members 21a and 21b is high, the weight of the first members 21a and 21b can be reduced by forming the space S inside the first members 21a and 21b, forming the outside in a shape similar to the shape of the space S, and reducing the plate thickness as described above. Further, since the first members 21a and 21b are made of the material having the thermal expansion coefficient substantially same as the thermal expansion coefficient of the stringer 12, it is not necessary to provide a gap in a longitudinal direction LD as with an existing technology, and it is not necessary to divide the first members 21a and 21b in the longitudinal direction LD.

However, if rigidity of the first members 21a and 21b is low, the first members 21a and 21b may be bent during handling, demolding, or the like, and an accurately shaped product may not be manufactured. Therefore, it is necessary to design the first members 21a and 21b so as to achieve sufficient rigidity by themselves. Accordingly, the first members 21a and 21b preferably have the cross-sectional shape high in cross-sectional secondary moment, such as a T-shape, an L-shape, and an I-shape, and preferably have a thickness of 2 mm or more.

The mandrel 20 thus configured eliminates necessity of division in the longitudinal direction LD. Therefore, it is not necessary to manage the gap, installation of the mandrel 20 becomes extremely easier, and a manufacturing cost can be reduced. For example, in a case where the mandrel is formed of an aluminum alloy in the existing technology, it is necessary to divide the mandrel into about five parts in order to manufacture the mandrel having a length of 5 m, and it is necessary to manage the gap at each of divided positions. In contrast, in the present embodiment, division of the mandrel 20 can be eliminated. Further, in a case of using an alloy with low expansion coefficient, which is expensive, the first members 21a and 21b are formed with a thickness enough to achieve sufficient rigidity, which makes it possible to reduce a use amount of the alloy with low expansion coefficient, and to reduce the manufacturing cost.

Note that if the first members 21a and 21b are each divided in the longitudinal direction LD in consideration of handling, demolding, and the like, the first member 21a is divided into a first member 21a-1 and a first member 21a-2 at a dividing point Pa, and the first member 21b is divided into a first member 21b-1 and a first member 21b-2 at a dividing point Pb at a position different from the position of the dividing point Pa. In other words, the first member 21a and the first member 21b are respectively divided at the dividing points Pa and Pb that are located at different positions in the longitudinal direction LD.

In the present embodiment, thermal strain may occur between the first members 21a and 21b and the second members 22a and 22b during formation (heating) of the stringer 12. More specifically, thermal elongation of the second members 22a and 22b occurs because the thermal expansion coefficient of the second members 22a and 22b is higher than the thermal expansion coefficient of the first members 21a and 21b. If the first members 21a and 21b are moved due to thermal elongation of the second members 22a and 22b, the shape of the stringer 12 may be deformed. Accordingly, it is necessary for the second members 22a and 22b to slide in the longitudinal direction LD without restraining the first members 21a and 21b, to eliminate thermal strain.

Therefore, surfaces on the outside of the first members 21a and 21b and surfaces on the inside of the second members 22a and 22b, namely, surfaces of the first members 21a and 21b and surfaces of the second members 22a and 22b coming into contact with each other are each formed flat without irregularity in the longitudinal direction LD. With such a configuration, the second members 22a and 22b can slide in the longitudinal direction LD without restraining the first members 21a and 21b, and eliminate the thermal strain.

Figure 5:
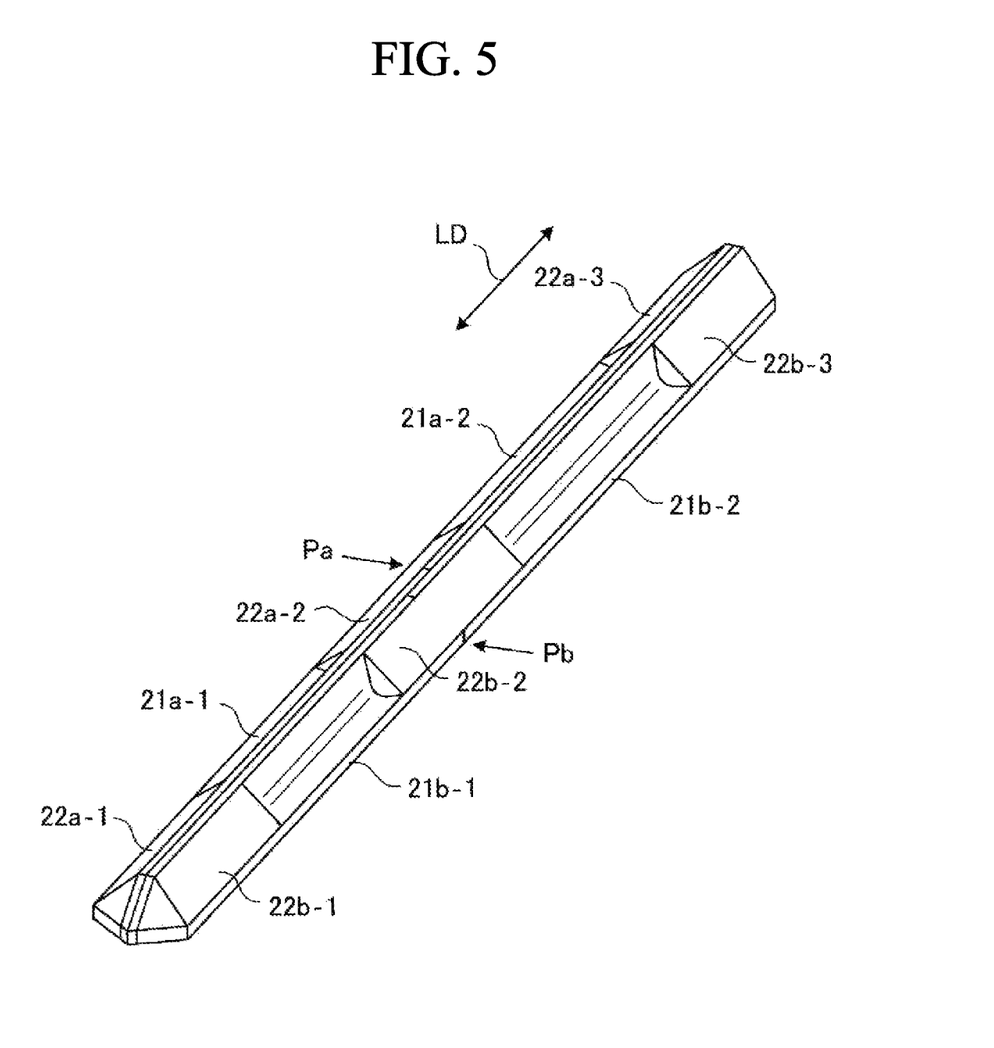
FIG. 5 is a diagram illustrating a modification of the second members illustrated in FIG. 4 and is a perspective view illustrating a state where the second members are disposed.

Further, each of the second members 22a and 22b may have the length same as the length of each of the first members 21a and 21b, and may be provided over the entire length of the first members 21a and 21b as illustrated in FIG. 4. Alternatively, as illustrated in FIG. 5, the second members 22a and 22b may be made up of a plurality of second members 22a-1 to 22a-3 and 22b-1 to 22b-3 each having a short length, and the plurality of second members 22a-1 to 22a-3 and 22b-1 to 22b-3 may be provided at a plurality of positions of a part of the entire length of the first members 21a and 21b. As described above, when the plurality of second members 22a-1 to 22a-3 and 22b-1 to 22b-3 each having the short length are used, sliding is facilitated to eliminate the thermal strain.

Note that in a case where the plurality of second members 22a-1 to 22a-3 and 22b-1 to 22b-3 are used and the first members 21a and 21b are also each divided in the longitudinal direction LD, any of the second members 22a-1 to 22a-3 and 22b-1 to 22b-3 is disposed at each of the dividing points Pa and Pb (for example, second members 22a-2 and 22b-2 are disposed in FIG. 5). Further, the angle member 25 may be made up of a plurality of angle members each having a short length in matching with the plurality of second members 22a-1 to 22a-3 and 22b-1 to 22b-3.

Further, thermal strain also occurs between the first members 21a and 21b and the angle member 25 and between the second members 22a and 22b and the angle member 25. Accordingly, the surfaces of the first members 21a and 21b and a surface of the angle member 25 coming into contact with each other and the surfaces of the second members 22a and 22b and the surface of the angle member 25 coming into contact with each other are also each formed flat without irregularity in the longitudinal direction LD.

In addition, to improve slidability with respect to the thermal elongation, release treatment, for example, application of a silicon-based or fluorine-based mold release agent, sticking of a mold release tape made of tetrafluoroethylene, surface treatment such as mold release coating is preferably performed on the surfaces of the first members 21a and 21b and the surfaces of the second members 22a and 22b coming into contact with each other, on the surfaces of the first members 21a and 21b and the surface of the angle member 25 coming into contact with each other, and on the surfaces of the second members 22a and 22b and the surface of the angle member 25 coming into contact with each other.

Next, a composite material molding method using the mandrel 20 and the angle member 25 according to the present embodiment will be described with reference to FIGS. 6A to 6C.

Figure 6A:
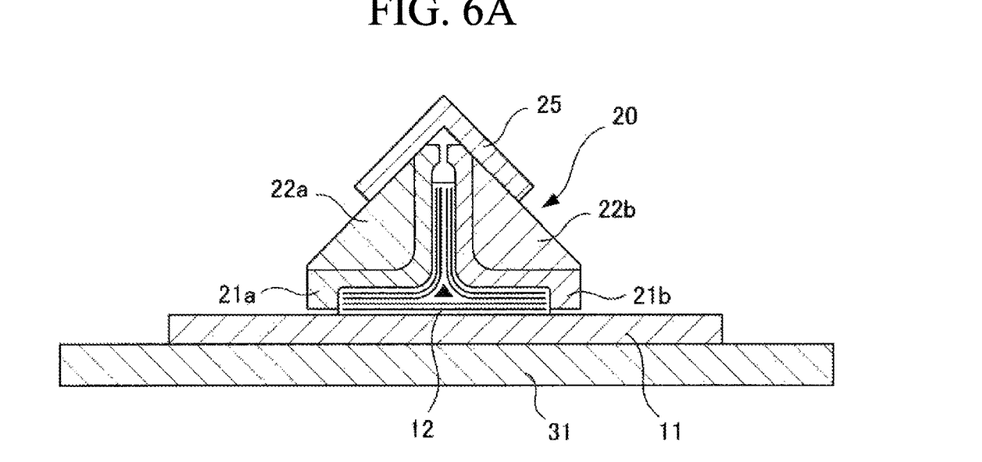
FIG. 6A is a diagram illustrating a composite material molding method using the composite material molding jig illustrated in FIG. 1 and is a cross-sectional view illustrating a state immediately after the composite material molding jig is disposed.

First, as illustrated in FIG. 6A, a cured or raw skin 11 is placed on a lower mold 31, and a raw stringer 12 (fiber base material) is placed on the skin 11. Further, the raw stringer 12 is placed in the space S inside the first members 21a and 21b, the first members 21a and 21b are placed in the space inside the second members 22a and 22b, and the angle member 25 is placed at the top part of the first members 21a and 21b and the second members 22a and 22b. At the time of placement, the above-described release treatment may be performed. Further, the second members 22a and 22b and the angle member 25 may be provided over the entire length of the first members 21a and 21b or at a plurality of positions of a part of the first members 21a and 21b.

Figure 6B:
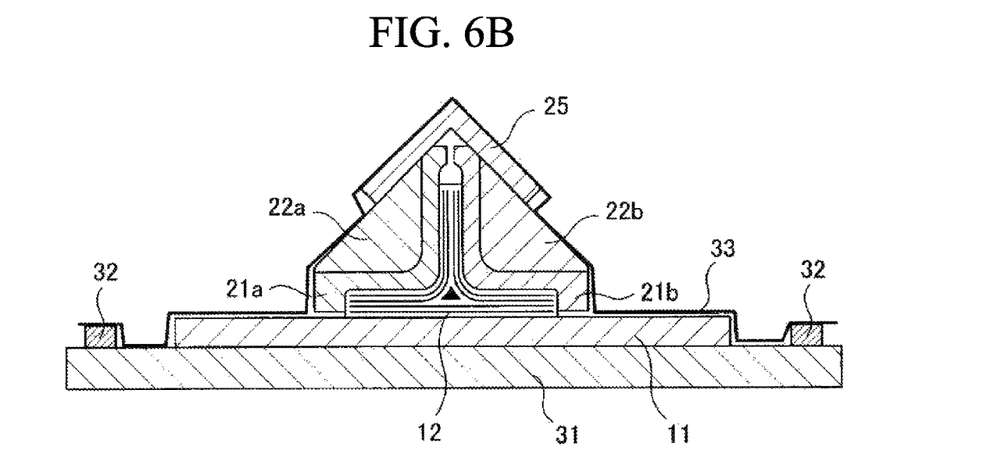
FIG. 6B is a diagram illustrating the composite material molding method using the composite material molding jig illustrated in FIG. 1, and is a cross-sectional view illustrating a state where a periphery of the composite material molding jig is sealed.

After the mandrel 20 and the angle member 25 are disposed, a ring-shaped sealant 32 (sealing means) is attached to an end of the lower mold 31, and a bagging film 33 (sealing means) is attached so as to cover the skin 11, the stringer 12, the mandrel 20, and the angle member 25 inside the sealant 32 as illustrated in FIG. 6B. The inside of the sealant 32 and the bagging film 33 is sealed in the above-described manner.

A vacuum apparatus is connected to one end of the bagging film 33, and a resin injection apparatus is connected to the other end of the bagging film 33. After the sealant 32 and the bagging film 33 are attached, the inside of the sealant 32 and the bagging film 33 is evacuated, a resin is injected into the inside of the sealant 32 and the bagging film 33, and the raw skin 11 and the raw stringer 12 are impregnated with the resin. After impregnation of the resin, the whole body is heated by an oven or the like. As a result, the resin is cured and the skin 11 and the stringer 12 are molded (cured) (see FIG. 6C). As the resin, a thermosetting resin cured by heating, for example, an epoxy resin or polyimide is used.

Figure 6C:
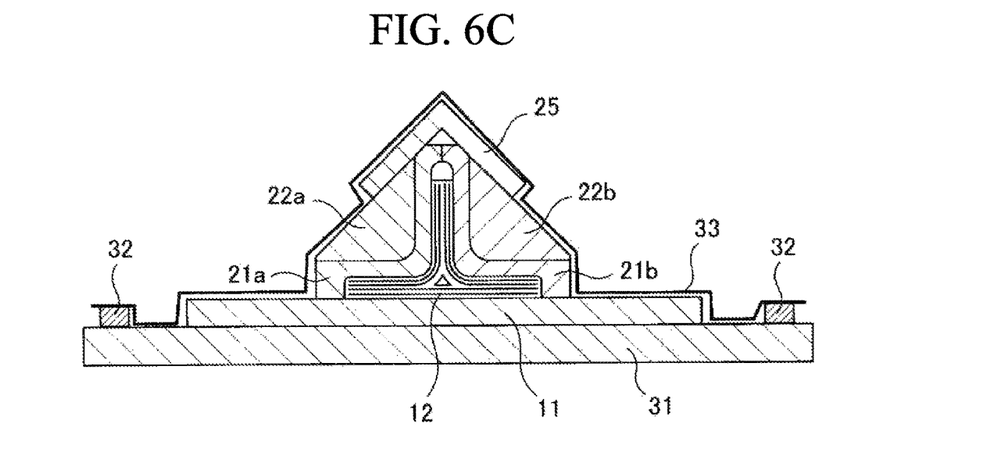
FIG. 6C is a diagram illustrating the composite material molding method using the composite material molding jig illustrated in FIG. 1, and is a cross-sectional view illustrating a state where the composite material molding jig and a stringer are heated and the stringer is cured.

Note that the molding method illustrated in FIGS. 6A to 6C is suitable in a case where the skin 11 is raw. In a case where the skin 11 has been already cured, the lower mold 31 is unnecessary, and the stringer 12 can be molded by a molding method illustrated in FIG. 7 or FIG. 8.

Figure 7:
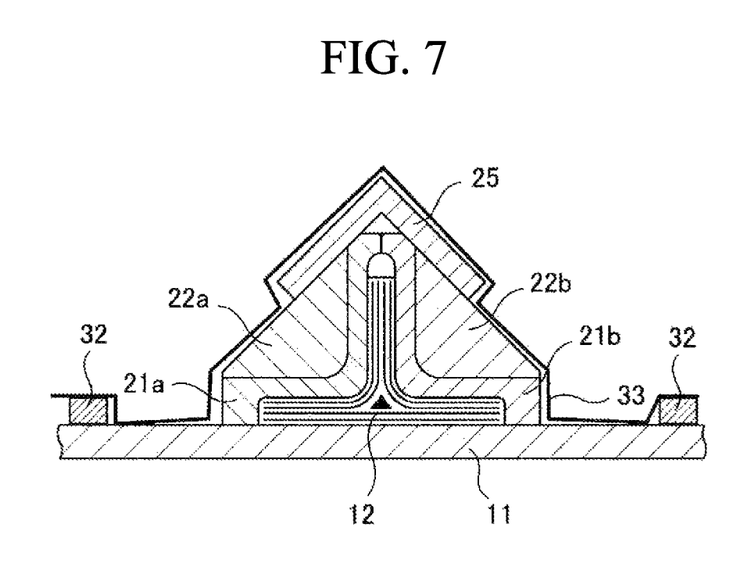
FIG. 7 is a cross-sectional view illustrating a modification of a seal structure illustrated in FIG. 6B.

For example, in the molding method illustrated in FIG. 7, the raw stringer 12 is placed on the cured skin 11. The mandrel 20 and the angle member 25 are disposed in the manner described with reference to FIG. 6A. Further, the ring-shaped sealant 32 is attached to an end of the cured skin 11, and the bagging film 33 is attached so as to cover the stringer 12, the mandrel 20, and the angle member 25 inside the sealant 32. In this case, the vacuum apparatus is connected to one end of the bagging film 33, and the resin injection apparatus is connected to the other end of the bagging film 33. After the sealant 32 and the bagging film 33 are attached, the inside of the sealant 32 and the bagging film 33 is evacuated, a resin is injected into the inside of the sealant 32 and the bagging film 33, and the raw stringer 12 is impregnated with the resin. After impregnation of the resin, the whole body is heated by the oven. As a result, the resin is cured, and the stringer 12 is molded (cured).

Figure 8:
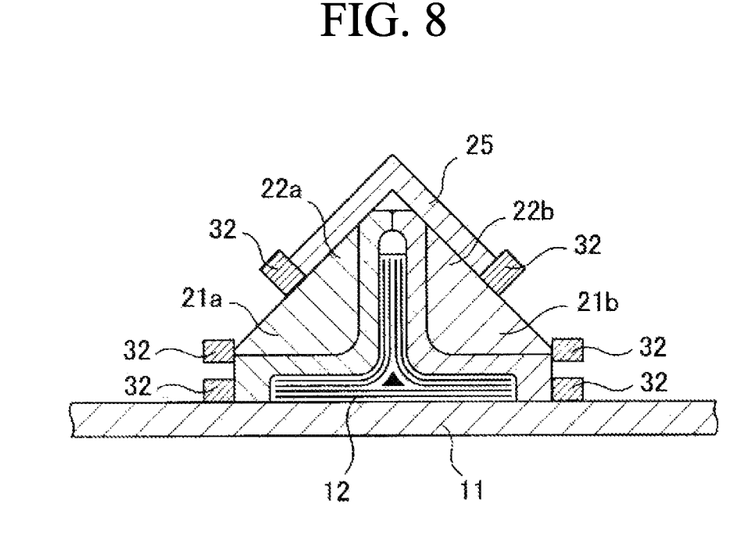
FIG. 8 is a cross-sectional view illustrating another modification of the seal structure illustrated in FIG. 6B.

Also in the molding method illustrated in FIG. 8, the raw stringer 12 is placed on the cured skin 11. The mandrel 20 and the angle member 25 are disposed in the manner described with reference to FIG. 6A. Further, the ring-shaped sealant 32 is attached to each of a gap of the mandrel 20, a gap between the mandrel 20 and the skin 11, and a gap between the mandrel 20 and the angle member 25, namely, to all of gaps around the stringer 12. In this case, the vacuum apparatus is connected to one end of the mandrel 20, and the resin injection apparatus is connected to the other end of the mandrel 20. After the sealants 32 are attached, an inside of a part sealed by the sealants 32 is evacuated, a resin is injected into the inside of the part sealed by the sealants 32, and the raw stringer 12 is impregnated with the resin. After impregnation of the resin, the whole body is heated by the oven. As a result, the resin is cured, and the stringer 12 is molded (cured).

FIGS. 6A, 6B, 6C, 7, and 8 described above each illustrate the sealant 32 as a sealing material; however, the other sealing material such as a sealing member may be used.

Further, each of the molding methods described in FIGS. 6A, 6B, 6C, 7, and 8 described above is called a Vacuum assisted Resin Transfer Molding (VaRTM); however, the mandrel 20 and the angle member 25 according to the present embodiment are usable in a vacuum heat molding, autoclave molding, or the like of a prepreg without being limited to the above-described methods.

INDUSTRIAL APPLICABILITY

The present invention is usable for the whole of the composite material application member.

REFERENCE SIGNS LIST

11 Skin
12 Stringer
20 Mandrel
21a, 21a-1, 21a-2 First member
21b, 21b-1, 21b-2 First member
22a, 22a-1, 22a-2, 22a-3 Second member
22b, 22b-1, 22b-2, 22b-3 Second member
25 Angle member
31 Lower mold
32 Sealant
33 Bagging film

The invention claimed is:

1. A composite material molding jig for molding a stringer made of a fiber base material and a resin on a plate member, the composite material molding jig comprising:
    a first member having a thermal expansion coefficient equivalent to a thermal expansion coefficient of the stringer, internally includes a space serving as a mold of the stringer, and has an outer surface formed flat in a longitudinal direction of the stringer; and
    a second member that is made of a material lighter than a material of the first member, internally includes a space shaped to contain the first member, and has an inner surface formed flat in the longitudinal direction, wherein
    the fiber base material is placed in the space inside the first member, and the first member is placed in the space inside the second member for molding the stringer,
    the second member is provided at a plurality of positions of a part of an entire length of the first member, wherein a topmost point of the second member does not exceed a topmost point of the first member, and
    a mold release agent, a mold release tape, or a mold release coating is disposed between the outer surface of the first member and the inner surface of the second member.

2. The composite material molding jig according to claim 1, wherein the first member is made of a plate member and has an outer shape that corresponds to a shape of the space serving as a mold of the stringer.

3. The composite material molding jig according to claim 1, wherein
    the first member is divided into two or more parts that are separable at a center in a width direction of the first member, and
    the second member is divided into two or more parts that are separable at a center in a width direction of the second member.

4. The composite material molding jig according to claim 3, wherein,
    the first member is divided, into the two or more parts, in the longitudinal direction at two or more dividing points that are located at different positions in the longitudinal direction.

5. The composite material molding jig according to claim 3, wherein
    the second member has a triangular prism shape as a whole including the first member, and
    an angle member that has an L-shaped cross-section and is fitted to a top part of the triangular prism shape is provided at the top part.

6. A composite material molding method of molding a stringer made of a fiber base material and a resin on a plate member, the composite material molding method comprising:
    placing the fiber base material to be the stringer, on the plate member;
    placing the fiber base material in a space inside a first member, the first member having a thermal expansion coefficient equivalent to a thermal expansion coefficient of the stringer, internally including the space serving as a mold of the stringer, and having an outer surface formed flat in a longitudinal direction of the stringer;
    placing the first member in a space inside a second member, the second member being made of a material lighter than a material of the first member, internally including the space shaped to contain the first member, and having an inner surface formed flat in the longitudinal direction;
    providing the second member at a plurality of positions of a part of an entire length of the first member, wherein a topmost point of the second member does not exceed a topmost point of the first member;
    sealing the plate member, the fiber base material, the first member, and the second member by a sealing means, and evacuating an inside of the sealing means;
    impregnating the fiber base material with a resin;
    heating and curing the resin to mold the stringer; and
    applying a mold release agent, a mold release tape, or a mold release coating between the outer surface of the first member and the inner surface of the second member.

7. The composite material molding method according to claim 6, wherein the first member is made of a plate member and has an outer shape that corresponds to a shape of the space serving as a mold of the stringer.

8. The composite material molding method according to claim 6, wherein
    a composite material molding jig is used to mold the stringer,
    the composite material molding jig comprises the first member and the second member,
        the first member is divided into two or more parts that are separable at a center in a width direction of the first member, and
        the second member is divided into two or more parts that are separable at a center in a width direction of the second member
        the first member is divided, into the two or more parts, in the longitudinal direction at two or more dividing points that are located at different positions in the longitudinal direction.

9. The composite material molding method according to claim 6, wherein the second member has a triangular prism shape as a whole including the first member, and an angle member that has an L-shaped cross-section and is fitted to a top part of the triangular prism shape is provided at the top part.

10. The composite material molding jig according to claim 2, wherein the first member is divided into two or more parts that are separable at a center in a width direction of the first member, and the second member is divided into two or more parts that are separable at a center in a width direction of the second member.

11. The composite material molding jig according to claim 1, wherein the first member is divided into two or more parts that are separable at a center in a width direction of the first member, and the second member is divided into two or more parts that are separable at a center in a width direction of the second member.

12. The composite material molding method according to claim 7, wherein the second member is provided over an entire length of the first member or is provided at a plurality of positions of a part of the entire length of the first member.

\* \* \* \* \*